March 27, 1951 W. J. GIBBONS 2,546,336
QUICK-ACTING CLAMPING DEVICE
Filed May 13, 1948
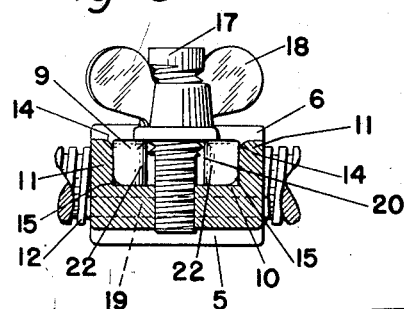
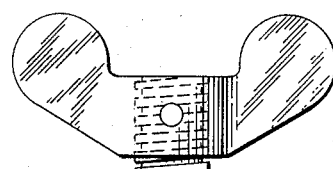
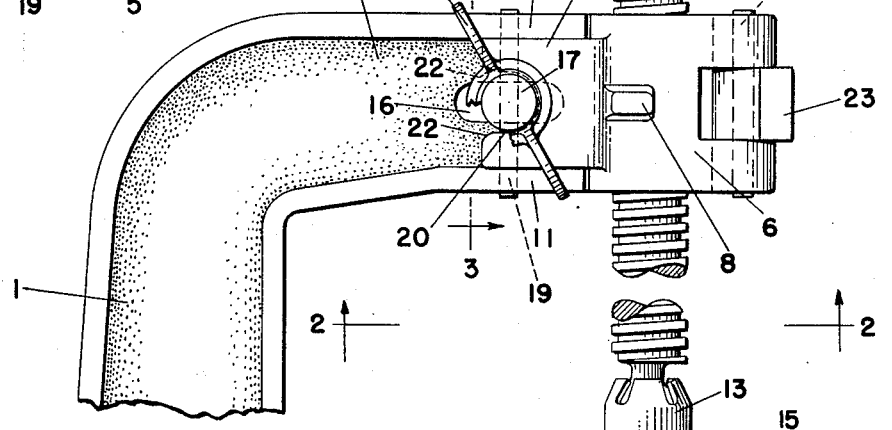
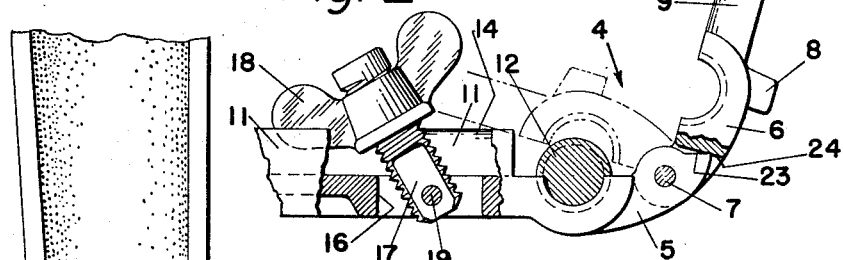
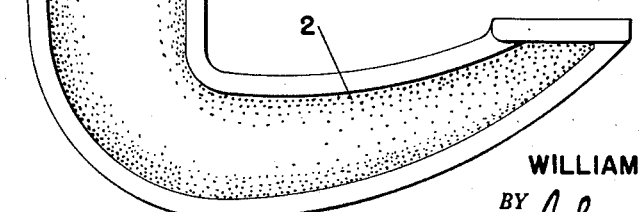
INVENTOR.
WILLIAM J. GIBBONS
BY John D. Myers
ATTORNEY Patented Mar. 27, 1951

2,546,336

UNITED STATES PATENT OFFICE 2,546,336

QUICK-ACTING CLAMPING DEVICE

William J. Gibbons, Philadelphia, Pa.

Application May 13, 1948, Serial No. 26,778

3 Claims. (Cl. 144—305)

The present invention relates generally to clamping devices and pertains particularly to clamps in which a threaded spindle acts in a split nut which may be easily opened and closed to permit expeditious removal of the spindle for adjustment thereof to a position adjacent the work piece whereby the necessity for rotating the spindle for its longitudinal translation for relatively long distances is obviated.

It is an object of the invention to provide an improved clamping device in which a threaded spindle is carried in a split nut which may be easily and quickly opened and closed for rapid adjustment of the spindle with respect to the work piece, the halves of the split nut carrying mutually cooperative aligning means whereby the correct alignment of the threads thereof is assured each time the nut is in the closed position.

Another object of the invention is to provide, in a clamping device of this description, a novel split nut construction the halves of which are provided with mutually cooperative aligning means adapted when the movable half of the split nut is moved in the closing direction to align the threads thereof with those of the spindle before these threads begin to mate, and when the movable half of the split nut is moved in the opening direction from the closed position to align the threads thereof with those of the spindle after said threads have ceased to mate, and, further, to maintain such alignment at all times while such threads are in mating position, whereby improper engagement or mutilation of said threads is effectively precluded.

Another object is to provide a clamping device of this description having quick-acting latching means associated with the two halves of the split nut, which latching means may be quickly and conveniently operated either to secure said split nut in the closed position or to release one of the halves thereof to permit the split nut to be opened.

The above and other objects and features of my invention will be fully understood from the following detailed description of a preferred form of the invention, throughout which description reference will be made to the accompanying drawing, in which:

Fig. 1 is a plan view of a screw clamp made in accordance with the present invention;

Fig. 2 is an elevational view, partly in section, of the end of the clamp containing the split nut, taken from the line 2—2 of Fig. 1 in the direction of the arrows, showing the movable portion of the split nut in the open position. By means of broken lines, this figure also shows the movable portion of the split nut in the partly closed position in which the aligning means have already become operative although the threads of the movable portion of the split nut have not yet begun to mate with those of the spindle. The hinge and latch members are shown partly broken away to illustrate more clearly the construction thereof; and Fig. 3 is a cross-sectional view taken along line 3—3 of Fig. 1 in the direction of the arrows.

Like numerals refer to like parts throughout the drawing and specification.

Referring to the drawing, there is shown a screw clamp comprising a C-shaped frame portion 1 having two opposed arms 2 and 3, the arm 3 carrying a split nut shown generally at 4. The split nut comprises a fixed half-portion 5 integral with the arm 3, and a movable half-portion 6 hingedly mounted on the fixed portion by means of a pin or rivet 7 and provided with a knob 8 or other means to facilitate opening of the split nut. Associated with the movable half-portion 6 of the split nut on the side thereof opposite the pin or rivet 7 is an extension or flange 9 which is adapted to be received snugly within a channel 10 defined by walls 11 formed in the fixed half-portion 5. The channel 10 is preferably formed as an integral part of the arm 3 and is of such width as to receive the flange 9 with sufficient exactness to prevent relative movement between these parts longitudinally of the axis of the split nut. A threaded spindle or thumb screw 12 of conventional design, having a swiveled foot 13, is carried in the split nut 4. It will be clear from the drawing that the arm 2 comprises a shoulder on the frame 1 which cooperates with the spindle to clamp a work-piece.

In order to facilitate entrance of the flange 9 into the channel 10 when the movable half-portion 6 of the split nut is moved toward the closed position I round off the opposite inside edges of the walls 11 forming the entrance of the channel, as at 14. For the same purpose, I also round off the opposite exterior edges 15 of the flange 9 which are the first to enter the channel. In this way I effectively prevent any interference between these edges when the movable portion of the split nut is moved in a closing direction, the rounded corners above referred to cooperating to guide the flange smoothly into the channel despite any ordinary misalignment of these parts as might arise, for example, through use of a worn hinge pin. It is also to be noted that the walls 11 of the channel rise a sufficient distance over the arm 3 so as to receive a portion of the flange 9 before the threads of the movable portion of the split nut begin to mate with those of the spindle 12. This condition is illustrated in Fig. 2 where the movable half-portion 6 of the split nut (in broken lines) is shown just entering the channel 10. By this construction the threads of the movable portion 6 and those of the spindle are brought into perfect alignment well before they begin to mate, thereby precluding any mutilation or undue wearing of the threads which might otherwise occur while opening or closing the split nut.

I prefer to position the hinge for the movable portion 6 substantially at the end of the arm 3, as shown, since by that construction I am able to secure several important advantages over screw clamps having such hinge positioned on the clamp arm inwardly of the split nut. By the latter construction, it is necessary either to cut away metal from the clamp arm to accommodate the movable elements of the hinge, which reduces the structural strength of the clamp arm, or to build up the stationary hinge elements on the clamp arm, in which case the weight of the clamp is increased and the clamp arm is encumbered with such additional structure. By positioning the hinge for the movable portion of the split nut at the end of the arm 3 I have avoided these undesirable features and, moreover, have provided a construction which permits the movable portion of the split nut to swing outwardly of the main body of the clamp, thereby leaving the fixed portion entirely open to permit the spindle 13 to be easily removed from the split nut and replaced therein without interference from such movable portion.

The channel 10 contains a slot 16 in which a bolt 17 having a wing nut 18 thereon is pivotally mounted by means of a pin 19. Formed in the flange 9 is a recess 20 adapted to be in alignment with the slot 16 and to receive the bolt 17 when the split nut is closed. It can be seen by inspection that when the split nut is closed it may be securely locked in that position by swinging the bolt 17 into the recess 20 to bring the wing nut 18 above flange 9 and thereafter tightening the wing nut down upon the flange. In order to minimize the time required for these steps I preferably round off the corner 21 of the flange 9 which must be cleared by the wing nut each time the bolt 17 is moved into or out of the recess 20. By so doing, and by pivoting the bolt 17 very near the point where the free end of flange 9 lies when the split nut is closed, as shown in the drawing, I have found that the wing nut need be turned only about one half of one revolution to travel between the high point necessary to clear the corner 21 and the low point at which the wing nut locks together the halves of the split nut. As shown in Figs. 2 and 3, the threads of bolt 17 are terminated near the free end thereof, thereby providing a convenient stop for the wing nut 18 by which the latter is desirably limited in its outward movement on the bolt only to the distance necessary to assure clearance of the corner 21 by the wing nut when the latter is swung into recess 20 as described above. With this construction it will be apparent that an appreciable economy of time is effected each time the split nut is opened and closed since the user of the clamp will never unscrew the wing nut beyond the point necessary to permit it to clear the corner 21 of the flange.

The opposed entrance corners of the recess 20 are rounded, as at 22, to facilitate entrance of the bolt 17 into the recess. The rear wall of the recess is curved to conform substantially to the curvature of the bolt 17, and is adapted to be contacted by the bolt to form a stop therefor when the latter is swung into the recess in carrying out its function as a latch member. By thus forming the rear wall of the recess so as to conform to the curvature of the bolt 17, a maximum area of metal is provided on the surface of flange 9 against which the wing nut 18 may be brought to bear when the split nut is locked in the closed position.

In the preferred embodiment of my invention shown in the drawing, I provide means for limiting the angular distance through which the movable portion 6 of the split nut may travel from the fixed portion 5. As shown, this limiting means comprises a shoulder 23 integral with the fixed portion 5 of the split nut adjacent the hinge, which shoulder is adapted to be contacted by an abutment surface 24 formed in the movable portion 6. The shoulder 23 and abutment surface 24 are preferably so arranged that the angular movement of the movable portion 6 of the split nut is prevented after it has moved approximately 110° from the fixed portion 5. Thus, if the spindle is to be adjusted in the clamp while the fixed portion 5 of the split nut is horizontal, which is the usual case, the movable portion 6 will be held conveniently in a substantially upright position by the limiting means just described, as shown in Fig. 2, permitting the user of the clamp to insert the spindle at the proper point within the fixed portion 5 of the split nut and, with the same hand if desired, rotate the movable portion 6 about its hinge to the closed position.

From the foregoing description it can readily be seen that clamps constructed according to the present invention may be quickly and easily adjusted to accommodate a work piece of any size within the limits of the clamp without turning the spindle except for minor fine adjustments. In the preferred form shown in the drawing, only a half-turn of the wing nut 18 is necessary to loosen the same sufficiently to clear the corner 21 of the movable portion 6 of the split nut, permitting the latter to be swung away from the fixed portion 5. The spindle 12 may then be lifted out of the fixed portion of the split nut and replaced therein in the new position desired, after which the split nut may be closed and locked in that position by a half-turn of the wing nut 18.

Although the present invention has been described and illustrated particularly as it pertains to C clamps, it will be understood that the invention has wider application and may be utilized equally well in any mechanical device in which a split nut may be employed, such as machinists' clamps, vices, milling machine dogs, lathe tool posts, and other devices.

What I desire to claim is:

1. A clamping device comprising a frame having a shoulder thereon, a split nut carried by said frame, a spindle threadably movable in said split nut toward and away from said shoulder, whereby an object may be clamped therebetween, said split nut comprising a fixed threaded portion integral with said frame and a complementary movable threaded portion hingedly carried by said fixed portion, a channel member integral with one of said portions on the side thereof opposite said hinge, the groove of said channel being disposed substantially perpendicular to the axis of said nut, a flange integral with the other of said portions and adapted to contact said channel member and mate snugly therewith when said split nut is closed, whereby the threads of said portions are maintained in alignment, a bolt pivotally carried by said channel member and having a wing nut adjacent the free end thereof, said flange containing a recess adapted to receive said bolt when said flange and said channel member are in mating position, said bolt being adapted to swing into said recess to position said wing nut above said flange whereby the flange may be secured within said channel member by said wing nut.

2. A clamping device in accordance with claim 1 wherein said bolt is pivotally mounted in a slot in the floor of said channel, and wherein limiting means are provided for limiting hinging movement between said portions, said limiting means comprising a pair of abutment surfaces carried respectively by said portions and adapted to contact each other when said movable portion is hingedly moved a predetermined distance from said fixed portion.

3. A clamping device in accordance with claim 1 wherein the opposed inside edges of the walls of said channel defining the entrance thereof are rounded to guide said flange into said channel when said movable portion is moved in a direction to close said split nut, the opposed outer edges of said flange adapted to enter said channel also being rounded to further guide said flange into said channel when said movable portion is moved in a direction to close said split nut, the opposed inner edges of said recess defining the entrance thereof being rounded to guide said bolt into said recess, the rearward wall of said recess being curved to conform substantially to the curvature of said bolt to form an abutment of maximum contact for said bolt when the latter is moved into said recess, the corner of said flange which said wing nut must clear when said bolt is moved into and out of said recess being rounded to reduce the travel of said wing nut on said bolt from its securing position, which travel of said wing nut is necessary to clear said corner.

WILLIAM J. GIBBONS.

REFERENCES CITED

The following references are of record in the file of this patent:

UNITED STATES PATENTS

| Number | Name | Date |
|---|---|---|
| 444,484 | Brown | Jan. 13, 1891 |
| 1,021,110 | Niewohner | Mar. 26, 1912 |
| 1,036,386 | Van Denburg | Aug. 20, 1912 |
| 1,099,224 | Wenslick | June 9, 1914 |
| 2,085,321 | Lang | June 29, 1937 |